//

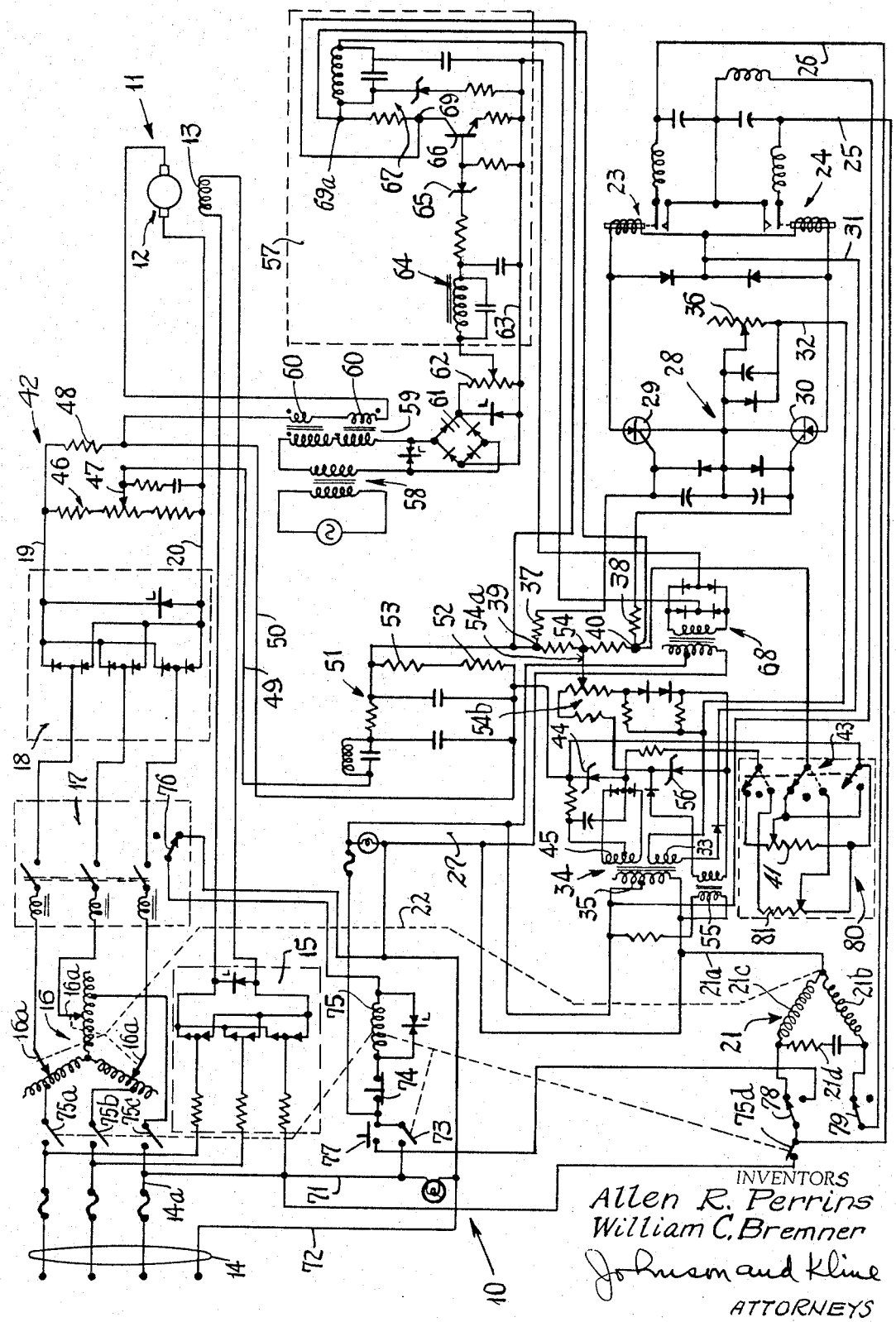

United States Patent Office 3,374,411
Patented Mar. 19, 1968

3,374,411
DIRECT CURRENT MOTOR CONTROL
Allen R. Perrins, Cheshire, and William C. Bremner, Newington, Conn., assignors to The Superior Electric Company, Bristol, Conn., a corporation of Connecticut
Filed June 15, 1965, Ser. No. 464,008
10 Claims. (Cl. 318—331)

ABSTRACT OF THE DISCLOSURE

A control for adjusting and maintaining the speed of a D.C. motor by regulating the voltage to the armature by use of an adjusting means having a constant rate of adjustment and stopping said adjustment whenever the armature current exceeds a predetermined value.

It has heretofore been suggested to control the speed of a D.C. motor by controlling the D.C. power to the motor and also to provide devices which enable manual and automatic adjustment of the power and hence the speed. In the higher integral horsepower motors, the power has generally been three phase alternating current whose value is adjusted prior to it being rectified into D.C. utilizable by the motor. While such control units have been found operable, in many instances they have not performed completely satisfactorily.

One difficulty has arisen where, when accelerating the motor current may exceed the desired maximum motor current as the control unit increases the voltage at a greater rate than the back EMF produced by the motor. Attempts to increase the voltage at a lesser rate however makes the control unit be quite slow in correcting for small deviations of the motor from its set speed. Also in abnormal situations, such as a sudden enlarged load on the motor, its speed may be reduced faster than the control unit can be actuated to decrease the power and hence too large a current may flow in the motor.

It is accordingly an object of the present invention to provide a control unit for controlling the speed of an electric motor in which the current to the motor is maintained below a desired maximum value.

Another object of the present invention is to provide a control unit which continually monitors the current to the motor and compares it with a set of value of maximum current desired and upon the motor current exceeding the desired maximum value either a further increase in the voltage across the motor and hence its current is prevented or a decrease in voltage across the motor is effected or the complete stopping of transmittal of power to the motor is effected.

A further object of the present invention is to provide a motor speed control unit which achieves the above objects but yet is quickly responsive to alter the voltage to the motor upon a deviation of the motor from its selected speed.

Another object of the present invention is to provide a control unit for selecting and adjusting the speed of an electric motor that is relatively economical to manufacture, reliable in use and which enables three phase alternating current to be utilized as the source of power for a D.C. motor.

In carrying out the present invention a feature thereof resides in providing a D.C. shunt motor having a field winding and an armature winding. The field winding is continually maintained energized by a substantially constant value of direct current while the armature winding is supplied with D. C. which has an adjustable voltage value. An adjustable voltage auto-transformer, preferably of the three phase type, operated by a substantially constant speed, reversible motor of the type shown in U.S. Patent Re. 25,445, is connected between a three phase source of alternating current and a rectifier bank with the output of the latter being connected to the armature. By operating the constant speed motor to adjust the auto-transformer, the value of D.C. voltage across the armature may be controlled. As the speed of the D.C. motor will vary with a change in value of voltage across its armature winding, its speed may thus be controlled.

In order to enable the motor speed to be corrected should it deviate from its desired value as rapidly as possible, and also to enable accelerating the motor from one speed to a higher speed as rapidly as the motor may accommodate the increase, the present invention provides for adjusting the rate of increase of the voltage across the armature winding at a rapid rate as compared to the ability of the motor to accelerate and increase its counter EMF to thereby limit its armature current. To prevent the armature motor current from exceeding a desired maximum value, there is provided a current sensing circuit which senses the motor current and if it exceeds the normal motor current by a small percentage, i.e. 5 to 10% thereof, then the voltage is prevented from increasing and will remain so until the motor current returns below the desired value. By the use of a current sensing circuit in the control unit both a rapid control of small speed changes and the acceleration of the motor at its maximum capabilities without harm to the motor may be achieved.

In addition, a further feature of the present invention resides in the utilization of a circuit for sensing the occurrence of an even higher motor current than the desired maximum value. If and when the even higher value of current occurs, power to the motor armature winding is stopped and the adjustable voltage autotransformer is operated to reduce its output voltage to a substantially negligible value. When the motor is started again by manual manipulation of the control unit, the voltage thereacross will be low and hence incapable of causing damage to the motor or to parts associated with the motor if the fault causing the even higher current is still present.

Other features and advantages will hereinafter appear.

Referring to the sole figure, which is an electrical schematic diagram of the present invention, the motor speed control unit is generally indicated by the reference numeral 10 and is employed to control the speed of a D.C. motor 11 having an armature winding 12 and a shunt field winding 13. The unit 10 is connectible to a source of three phase power, generally indicated by the reference numeral 14 and a rectifying circuit encolsed within the dotted line block 15 supplies continuously to the D.C. field winding a direct current having a substantially constant value. Also connected to the three phase input leads 14 is a three phase adjustable autotransformer, generally indicated by the reference numeral 16, with the output of the autotransformer being led through circuit breakers 17 and a rectifier block 18 enclosed within the dotted line block. There is thus produced in leads 19 and 20 a direct current which is supplied to the armature winding 12 and which has an adjustable voltage value.

The motor 11 is of the conventional shunt wound direct current type whose speed may be varied by the current in its armature winding. The value of current in the armature winding is dependent upon the difference in value between the voltage supplied to the motor in the leads 19 and 20 and the back EMF of the motor with the back EMF being directly proportional to the speed. Thus as the voltage increases in the leads 19 and 20, more current tends to flow in the armature winding which tends to increase the speed of the motor until the back EMF limits the current to that needed to produce the required torque and hence maintain the motor at a speed related to the adjustable voltage.

In accordance with the present invention, the autotransformer 16 is adjusted to adjust its output voltage by a reversible motor, generally indicated by the reference numeral 21 and may preferably be of the type that is reversible and of a substantially constant speed. The motor is mechanically connected to the brushes 16a of the autotransformer to control the position and movement thereof and is diagrammatically connected as by the dotted line 22. More particularly the motor 21 is more fully described in U.S. Patent Re. 25,445 which is assigned to the same assignee as the present invention.

The motor is energized either through a relay 23 which when closed energizes the motor 21 to effect its revolving in a direction which increases the output voltage of the autotransformer or through another relay 24, which when closed, causes the motor 21 to move in the other direction to thereby decrease the output voltage of the autotransformer. The motor is connected through the relays and leads 25 and 26 to a source of alternating current, generally indicated by the reference numeral 27, with a common motor lead 21a completing the circuit through either relay. The relays are shown in a normally open position which maintains the motor in a stationary condition.

The relays 23 and 24 are operated by a control circuit, generally indicated by the reference numeral 28 and which includes a pair of SCS switches 29 and 30. When a signal of sufficient magnitude is applied between the gate and cathode of the SCS 29, for example, the relay 23 will close effecting an increase in the motor speed while if the signal is applied between the gate and cathode of SCS 30, the relay 24 is closed, causing the motor to move in the opposite direction to thereby lower the voltage value across the D.C. armature winding and enable the motor to decrease its speed. For energizing the relays by unidirectional current, there is provided a pair of leads 31 and 32 which are connectible to a secondary winding 33 of a transformer 34 that has a primary winding 35 connected across the alternating current source 27. An adjustable resistor 36 provides for changing the gain of the relay amplifiers including SCS's 29 and 30 to decrease their sensitivity when conducting.

The gate of SCS 29 is connected through a resistor 37 while the gate of SCS 30 is also connected through a resistor 38 to points 39 and 40 respectively. It will be appreciated that if the point 39 is sufficiently plus with respect to the cathode of the SCS 29, it will cause conduction thereof. Also, if the point 40 is sufficiently plus with respect to the cathode of SCS 30 it will cause conduction thereof. While SCS's are employed herein, it will be appreciated that SCR's or other triggering devices may be employed if desired with the SCS's however being capable of tolerating a greater reverse bias on their gates and hence are preferred.

Applied to the points 39 and 40 are voltage values derived from an adjustable resistor 41 which is utilized to set the speed at which the motor is desired to operate and a signal derived from the back EMF of the motor through an EMF sensing circuit, generally indicated by the reference numeral 42. Thus when the voltage values of these signals are in balance, neither SCS is conducting and the motor is maintained stationary. If the speed of the motor increases beyond that set by the potentiometer 41, the SCS 30 will become conductive causing the motor to adjust the autotransformer to decrease the voltage to the armature winding. On the other hand if the motor is rotating at a speed less than that set by the potentiometer 41, the SCS 29 will become conductive, causing the motor to rotate the brushes of the autotransformer in a direction that increases the voltage to the armature winding until the speed of the motor produces a back EMF which is in balance with the signal produced by the potentiometer 41.

The potentiometer 41 is connectible through switches 43 that may be manually operated to have its ends positioned across a Zener diode 44 and its tap connected to the point 40. The Zener diode 44 is interconnected through rectifying diodes to a winding 45 on the transformer 34 to produce thereacross a substantially constant value of unidirectional voltage, a proportion of which, as determined by the setting of the tap of the potentiometer 41 is placed at the point 40.

The back EMF sensing circuit 42 has a resistance network 46 that includes an adjustable tap 47 placed across the leads 19 and 20 and a resistor 48 placed in series with the lead 19. The output of the sensing circuit 42 is between a pair of leads 49 and 50, with the former being connected to the tap 47 and the latter to the resistor 48. The lead 50 is positive with respect to the lead 49 and the voltage produced therebetween is directly proportional to the counter EMF of the motor and hence its speed. The leads 49 and 50 are connected to a filtering and proportioning network 51 that includes resistors 52 and 53 with a connection from the end of the resistor 53 being made to the point 39. It will thus be appreciated that there is applied to the point 39 a negative signal proportional to the counter EMF while at the point 40 there is provided a negative signal proportional to the desired counter EMF of the motor and hence its speed.

In order to enable the difference in the values of the signals or a change in one with respect to the other to operate the SCS's 29 and 30, a point 54 intermediate the points 39 and 40 is connected to a tap 54a of an adjustable potentiometer 54b that supplies a clipped half wave positive potential every half cycle of alternating current to the point 54 by reason of a transformer winding 55 and a Zener diode 56. The gates and cathodes of the SCS's 29 and 30 are accordingly connected in a circuit with the point 54, points 39 and 40 and the common connection of the cathodes through the resistor 36 and the lead 32. Thus with a negative signal applied to both points 39 and 40 the gates of the SCS's 29 and 30 are accordingly biased negatively with respect to their cathodes and the SCS's do not conduct. If however either point should decrease its negative potential, then the voltage at the gate in effect increases positively until it causes conduction of its associated SCS. For a more detailed description of the control circuit for operating the motor 21, reference is made to copending application Ser. No. 264,552, filed Mar. 12, 1963, now Patent No. 3,312,891, granted Apr. 4, 1967 and assigned to the assignee of the present invention.

In the event that the armature current exceeds a desired maximum value which may be 105 to 110% of its normal rated value, there is provided a current control circuit, generally indicated by the reference numeral 57. The circuit 57 senses the value of the armature current and if it exceeds a set value it transmits a signal which stops the motor from increasing the voltage across the armature winding until the armature winding current drops below the set value, at which time the motor may be again operated to increase the voltage. The circuit 57 includes an isolation transformer 58 having a primary connectible to a suitable source of alternating current such as 110 volt, 60 cycle and a saturable current-to-voltage transductor 59 having gate windings connected in series with the secondary winding of the transformer 58 and a pair of serially connected but oppositely wound control windings 60. The windings 60 are connected in series with the lead 19 and the armature winding 12. The secondary winding of transformer 58 and the gate windings of transductor 59 are connected in series with a full wave rectifying bridge 61. It will thus be appreciated that the current in the windings 60 provides magnetic flux in the cores of the transductor 59 proportional to the value of the current to the armature and as such changes the inductive impedance of the gate windings of transductor 59. Accordingly, through the bridge 61 there is an alternating current which bears a direct relationship with the value of current flowing to the armature winding.

The output of the bridge 61 consists of a rectified alternating current which flows through an adjustable potentiometer 62. Connected across the tap of the potentiometer 62 and a common lead 63 is a filtering and proportioning circuit, generally indicated by the reference numeral 64, while a Zener diode 65 has its cathode connected to the filtering circuit 64 and its anode to the base of a transistor 66. Across the collector and emitter of transistor 66 is positioned another filter and proportioning circuit, generally indicated by the reference numeral 67 which provides a positive voltage for operating the collector-emitter path of the transistor 66 and which in turn is connected to receive its power from the output of a rectifying circuit 68. The circuit 68 is connected to the source 27 which in turn, as will be more fully set forth, is connected across one phase of the three phase alternating current supply 14.

In the operation of the current limiting circuit 57, the potentiometer 62 is adjusted to set the desired level or value of armature winding current which is desired not to be excessively exceeded. The use of an adjustable potentiometer enables the control circuit of the present invention to be utilized with different motors each having a different normal current rating. With the armature current below the desired level the transistor 66 is nonconducting. Thus a point 69 and a point 69a will have essentially the same voltage and as these two points are connected to the points 39 and 40 respectively, they will have no effect on the balance of voltages between the points 39 and 40. Upon the armature winding current exceeding the desired level, there is placed across the Zener diode 65, a voltage greater than its normal breakdown voltage which places between the base and emitter of transistor 66 a triggering voltage sufficient to cause conduction in its collector-emitter path. Upon conduction, the point 69 assumes a more negative potential with respect to the point 69a and the potential difference is transferred to the points 39 and 40 rendering the point 39 more negative with respect to the point 40.

The value of the negative potential applied from the circuit 57 is greater than that derived from the back EMF sensing circuit 42 and even though this circuit 42 attempts to place the point 39 at a relatively positive potential which would cause conduction of the SCS 29, it is overcome by the more negative voltage applied from the control circuit 57. The SCS 29 is prevented from conducting or if conducting rendered nonconducting. When the current in the armature is greater than its normal current, the motor inherently attempts to increase its speed thereby increasing is back EMF and the latter will cause lowering of the value of armature current until it reaches a value below the current level set by the potentiometer 62. When this occurs, transistor 66 ceases conducting and the counter EMF circuit 42 again controls the voltage SCS 29.

In the motor speed control unit of the present invention, there is provided a pair of leads 71 and 72 connected to one phase 14a of the three phase input and to a neutral line respectively. The lead 71 connects through a normally open switch 73, a normally closed stop switch 74, contactor or relay coil 75 and a switch 76 to form one side of the source 27 and the lead 72 forms the other side. There is also provided a momentarily closable start switch 77. The switch 76 is part of the circuit breaker 17 and is closed when the circuit breaker is closed. While the contactor coil 75, as diagrammatically shown is connected to switches 75a, 75b and 75c positioned in each phase between the source 14 and the autotransformer 16. Additionally, the contactor coil 75 operates the switch 73 and another switch 75d connected in a line between the motor 21 and the signal phase connection lead 71. The switch 75d is normally closed when the contactor 75 is not energized and hence whenever the contactor 75 becomes energized, switch 75d opens. The other switches 73, 75a, 75b and 75c all are normally open and close whenever the contactor coil 75 is energized.

Connected between the motor windings 21b and 21c is a phase shifting network 21d together with a lower limit switch 78 and an upper limit switch 79 each having their normal or unactuated position shown in solid lines. The switches 78 and 79 are placed at the locations on the autotransformer which define the extremes of movement of the brushes 16a and are positioned to be engaged and actuated by the brushes at these extreme positions to deenergize the motor 21.

It will be appreciated that upon pressing of the start switch 77, the contactor coil 75 is energized closing switches 75a–75c, switch 73, and opening switch 75d to thus provide power to the control circuits, the motor 21 and the motor 11. Assuming that the motor 11 is stationary, the point 39 will be less negative, effecting conduction of SCS 29 and subsequent inphase energization of the winding 21c to cause the motor to operate the brushes in a manner which increases the output voltage therefrom. The output voltage causes current to flow in the armature winding 12 and the motor will begin accelerating. However, the speed of the motor 21 is capable of increasing the output voltage of the autotransformer at a rate that is faster than the motor 11 may accelerate in most applications and produce opposing back EMF to limit the armature current to a value less than that set by the potentiometer 62. When the current sensing circuit 57 senses that the armature current is above the desired value, it functions to deenergize the winding 21c preventing a further increase in voltage across the armature winding 12 until the armature current drops below the desired value.

If the motor 11 has a speed less than the speed selected by the potentiometer 41, the SCS 29 will again become conducting, again energizing the motor 21 to move the brushes to increase the output voltage of the autotransformer. Again however the voltage will increase to increase the armature current faster than the back EMF is able to limit the armature current to less than the desired value. When the armature winding current again exceeds the desired value, the control current 57 will stop the motor 21 from increasing the voltage until the current decreases below the desired value.

The motor and control circuit will function in this manner providing in effect stepped increases of voltage but yet not exceeding excessively the desired value of armature winding current until the speed of the motor 11, as set by the potentiometer 41, is achieved. The motor 11 by reason of the potentials of the points 39 and 40 will then have its speed maintained by operation of the back EMF sensing circuit 42 and the potentiometer 41 with their control over movement of the motor 21. The output voltage of the autotransformer will be adjusted to maintain the desired speed and if the armature current should exceed the desired value the current sensing circuit 57 will function.

By reason of the circuit 57 being essentially an amplifier circuit, it will function for small excursions of value of the armature winding current above the set value to only prevent the motor 21 from increasing the voltage across the armature winding while for relatively larger values of armature current above the set value, the circuit 57 will not only prevent the SCS 29 from conducting, but will cause the SCS 30 to conduct to thereby decrease the output voltage. This is achieved by the points 40 and 69a becoming relatively positive as the points 39 and 69 become greater negatively.

In the event that there is an exceedingly abnormal situation, where for example greater than 120 to 125% of rated current flows in the armature winding which may occur if the motor is suddenly stopped, the circuit breaker 17 will open, opening switch 76 and deenergizing contactor coil 75. The coil 75 opens the switches 75a–75c and 73 and closes switch 75d. This action disconnects the input of the autotransformer from the source 14 while its output by the circuit breaker 17 is disconnected from the motor 11. Moreover, in accordance with the present invention the motor 21 is energized to move the brushes until the autotransformer 26 is set to provide its minimum value of output voltage. This is achieved by energizing in-phase winding 21c of the motor 21 through the switch 75d and leads 71 and 72. The motor 21 continues to move the brushes of the autotransformer until the motor 21 is deenergized by the brushes operating the lower limit switch 78 to open the circuit. The switch 78 is positioned to be operated at the position of the brushes which produces the minimum value of output voltage desired and preferably is substantially zero.

It will be understood that the motor 21 is a constant speed motor and in order to correct deviations of the speed of the motor from a selected value, it changes the voltage from the autotransformer quite rapidly. However, this rate of change is generally faster than the speed which the motor 12 in accelerating may oppose by its counter EMF and thus limit the armature current to less than the desired maximum value. In this manner a close control over the speed of the motor during normal running conditions is achieved but yet, during acceleration from a low speed to a high speed, the prevention of injury to the motor by excessive values of current therethrough is prevented. Thus the circuit of the present invention may be utilized with many different size motors having different acceleration characteristics without requiring modification in the control circuit other than if necessary setting of the potentiometer 62 and the values of the components in the EMF sensing circuit 42.

It has been found desirable to incorporate, in addition to the start and stop switches 77 and 74 respectively, a control panel 80 which includes the adjustable potentiometer 41, switch 43 and another adjustable potentiometer 81. The control panel enables an operator by operation of the switch 43 to either connect the potentiometer 41 or 81 to set and control the speed of the motor 11 or at two different speeds namely a high and low respectively or to stop the motor by not having either potentiometer connected. For the high speed condition the three switch arms of switch 43 are connected as shown in full lines, for the low speed condition they are shown in dotted lines and for the third condition, i.e. stop, the switch arms are connected to the remaining terminals of the switch, namely the intermediate terminals. It will be understood that when the switch arms are engageable with the intermediate contacts then the potentiometers 41 and 81 are disconnected from the point 40 and the SCS 30 will be rendered conducting to decrease the output voltage of the adjustable autotransformer 16. When the switch arms are in the dotted line position then the potentiometer 81 is connected to the point 40 and will serve as an extremely low speed setting.

It will accordingly be appreciated that there has been provided an adjustable speed motor control unit which is capable of maintaining the speed of a D.C. motor within close limits of its adjusted value. The unit functions by controlling the voltage across the armature winding of the D.C. motor and in accordance with the present invention the voltage is automatically adjusted by a deviation of the speed of the motor from its set value. However, if the current in the armature winding exceeds a desired value, the unit functions to prevent a further increase in the voltage across the armature winding until it is reduced below its desired value. In an abnormal situation where an excessively large current is caused to flow in the armature winding, the control circiut stops the conduction of power to the armature winding and also sets the value of voltage across the armature winding at a low value, when the motor is manually started again.

Variations and modifications may be made within the scope of the claims and portions of the improvements may be used without others.

We claim:

1. An adjustable motor speed control unit comprising a D.C. motor having armature and field windings, a source of alternating current, adjustable voltage means including a movable element for providing a D.C. having an adjustable voltage value determined by the position of the element, said means upon operation normally increasing the value of the D.C. voltage at a greater rate than the value of the counter EMF of the motor increases, means connecting the armature winding to receive the D.C. adjustable setting means for setting a desired speed of the motor, means for sensing the deviation of the motor from the desired speed and producing a signal indicative of the direction of deviation, said adjustable voltage means being connected to receive the signal and alter the value of the D.C. voltage in accordance with the signal thereto, curent sensing means for sensing the value of the armature current, and limiting means connected to the adjustable voltage means and the current sensing means for preventing the adjustable voltage means from increasing the value of D.C. voltage when the armature current exceeds a predetermined value by stopping the movement of the movable element.

2. The invention as defined in claim 1 in which the adjustable means includes an adjustable voltage autotransformer, the movable element is a brush, and a constant speed reversible motor is connected to said brush.

3. The invention as defined in claim 2 in which the reversible motor has a first channel which when closed operates the motor in one direction to increase the value of the D.C. voltage and a second channel which when closed operates the motor in the other direction to decrease the value of the D.C. voltage, and in which the adjustable voltage means includes a normally open relay in each of said channels.

4. An adjustable motor speed control unit comprising a D.C. motor having armature and field windings, a source of alternating current, adjustable voltage means including a movable element for providing a D.C. having an adjustable voltage value determined by the position of the element, means connecting the armature winding to receive the D.C., adjustable setting means for setting a desired speed of the motor, means for sensing the deviation of the motor from the desired speed and producing a signal indicative of the direction of deviation with a first direction effecting an increase in the value of the D.C. voltage and a second direction effecting a decrease in the value of the D.C. voltage, said adjustable voltage means being connected to receive the signal and alter the value of the D.C. voltage in accordance with the signal thereto at a constant rate which normally increases the output voltage at a greater rate than the value of the counter EMF of the motor increases, current sensing means for sensing the value of the armature current, and limiting means connected to the adjustable voltage means and the current sensing means for stopping the adjustable voltage means from increasing the value of D.C. voltage when the armature current exceeds a predetermined value, said limiting means including signal producing means that is operative when the armature current exceeds the predetermined value to produce a signal having a direction which opposes the first direction and having a magnitude greater than that of the signal from the sensing means to produce a cumulative signal having a value that is less than that required to effect an increase in the value of the D.C. voltage.

5. The invention as defined in claim 4 in which the signal producing means includes means for producing a voltage related to the value of armature current and includes a current to voltage transformer having a current winding connected in series with the armature winding, and means for amplifying the voltage to produce the signal from the limiting means.

6. The invention as defined in claim 5 in which the limiting means includes an adjustable member for altering the predetermined value of the current, said member being positioned to alter the relationship between the voltage and the value of current.

7. The invention as defined in claim 4 in which the signal from the limiting means varies in amplitude with the value of armature current greater than the predetermined value and a large magnitude of the cumulative signal causes said adjustable voltage means to decrease the value of the output voltage.

8. An adjustable motor speed control unit comprising a D.C. motor having armature and field windings, a source of alternating current, adjustable voltage means for providing a D.C. having an adjustable voltage value, means connecting the armature winding to receive the D.C. adjustable setting means for setting a desired speed of the motor, circuit breaker means responsive to the output of the adjustable voltage means and operative upon an excessive current flowing therethrough, means for sensing the deviation of the motor from the desired speed and producing a signal indicative of the direction of deviation, said adjustable voltage means being connected to receive the signal and alter the value of the D.C. voltage in accordance with the signal thereto, current sensing means for sensing the value of the armature current, and circuit means connected to the circuit breaker and responsive upon operation thereof for effecting energization of adjustable voltage means to alter any D.C. voltage therefrom to a minimum value.

9. An adjustable motor speed control unit comprising a D.C. motor having armature and field windings, a source of alternating current, adjustable voltage means for providing a D.C. having an adjustable voltage value, circuit breaker means responsive to the output of the adjustable voltage means and operative upon an excessive current flowing therethrough, means connecting the armature winding to receive the D.C., adjustable setting means for setting a desired speed of the motor, means for sensing the deviation of the motor from the desired speed and producing a signal indicative of the direction of deviation, said adjustable voltage means being connected to receive the signal and alter the value of the D.C. voltage in accordance with the signal thereto, current sensing means for sensing the value of the armature current, limiting means connected to the adjustable voltage means and the current sensing means for preventing the adjustable voltage means from increasing the value of D.C. voltage when the armature current exceeds a predetermined value, and circuit means connected to the circuit breaker and responsive upon operation thereof for effecting energization of the adjustable voltage means to alter any D.C. voltage therefrom to a minimum value, said excessive current having a value larger than the predetermined value.

10. The invention as defined in claim 9 in which the adjustable voltage means includes an adjustable voltage autotransformer, a reversible motor connected thereto, said motor having one channel which upon energization adjusts the autotransformer to a minimum output voltage position, and said circuit means, upon energization, energizing said channel.

References Cited
UNITED STATES PATENTS

| | | | |
|---|---|---|---|
| 2,858,495 | 10/1958 | Shrider | 318—332 X |
| 2,967,270 | 1/1961 | Drenning | 318—344 X |
| 3,021,466 | 2/1962 | Greening et al. | 318—331 X |
| 3,166,700 | 1/1965 | Zarleng | 318—344 X |
| 3,239,742 | 3/1966 | Mierendorf et al. | 318—331 |
| 3,268,790 | 8/1966 | Novak | 318—331 |

ORIS L. RADER, *Primary Examiner.*

J. J. BAKER, *Assistant Examiner.*